United States Patent

Bunte et al.

[15] 3,694,132
[45] Sept. 26, 1972

[54] EXTRUSION DIE DECKLE MEANS

[72] Inventors: William S. Bunte, Somerville; Lino E. De Gasperis, Clinton, both of N.J.

[73] Assignee: Egan Machinery Company

[22] Filed: Jan. 21, 1971

[21] Appl. No.: 108,459

[52] U.S. Cl. .................................................. 425/466
[51] Int. Cl. ............................................ B29d 11/04
[58] Field of Search ............ 18/12 DS, 15 F; 425/466

[56] References Cited

UNITED STATES PATENTS

| | | |
|---|---|---|
| 3,293,689 | 12/1966 | Chiselko ................. 18/12 DS |
| 2,982,995 | 5/1961 | Groleau .................. 18/12 DS |
| 3,018,515 | 1/1962 | Sneddon ................. 18/12 DS |
| 3,107,191 | 10/1963 | Brownold ............. 18/12 DS X |
| 3,238,563 | 3/1966 | Hoffman ................. 18/12 DS |
| 3,443,277 | 5/1969 | Frielingsdorf ........... 18/12 DS |
| 2,712,155 | 7/1955 | Nelson ................. 18/12 DS X |
| 3,464,087 | 9/1969 | Koch ....................... 18/12 DS |

Primary Examiner—J. Spencer Overholser
Assistant Examiner—Ben D. Tobor
Attorney—F. J. Pisarra

[57] ABSTRACT

An extrusion die having a discharge orifice in the form of a relatively long narrow slot and adapted to extrude a film or sheet of a flowable plastic material. The die is equipped with external deckle means adjustably positioned along the outer end of the discharge orifice and internal deckle means adjustably positioned along the inner end of the discharge orifice. The die and the external and internal deckle means are so constructed and arranged as to effectively regulate and control both the width and the thickness of a plastic film or sheet that is extruded from the die.

12 Claims, 14 Drawing Figures

PATENTED SEP 26 1972
3,694,132
SHEET 1 OF 3
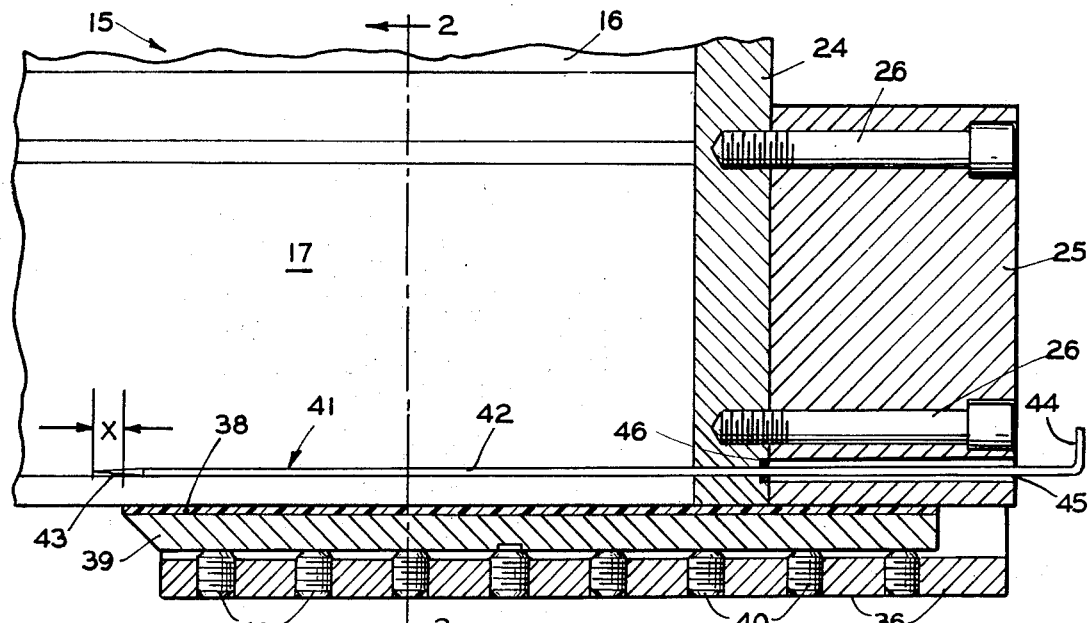
FIG. 1
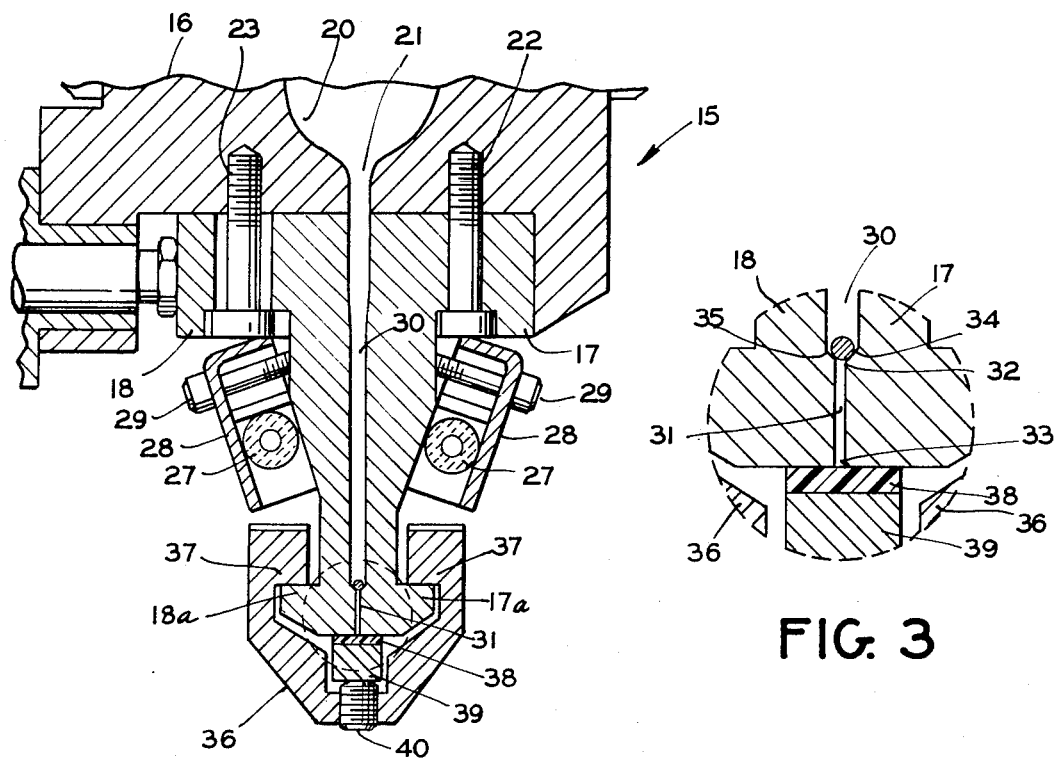
FIG. 2
FIG. 3
INVENTORS
WILLIAM S. BUNTE
LINO E. DE GASPERIS
BY F. J. Pisarra
ATTORNEY

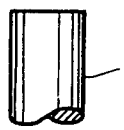 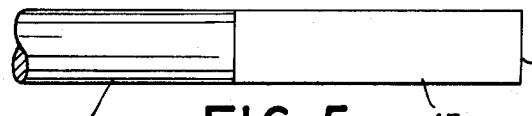
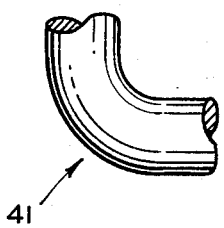 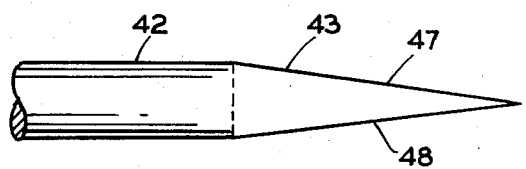 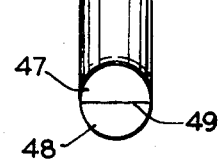
FIG. 5 FIG. 4 FIG. 6
 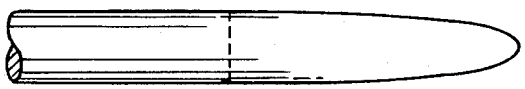
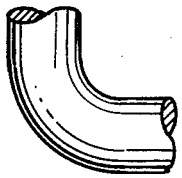 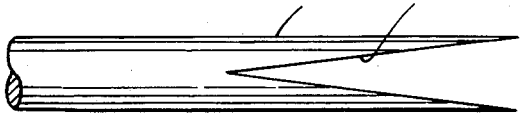 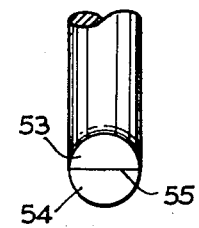
FIG. 8 FIG. 7 FIG. 9
 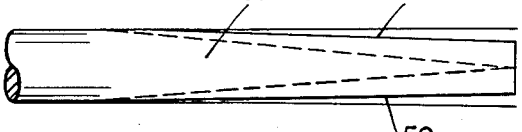
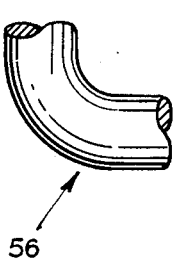  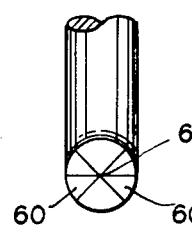
FIG. 11 FIG. 10 FIG. 12
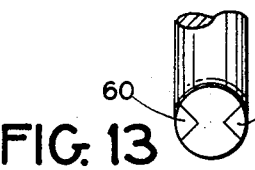
FIG. 13
INVENTORS
WILLIAM S. BUNTE
LINO E. DE GASPERIS
BY F. J. Pisarra
ATTORNEY

3,694,132

EXTRUSION DIE DECKLE MEANS

BACKGROUND OF THE INVENTION

This invention relates to the art of extruding plastic materials and, more particularly, to an extrusion die having a discharge orifice in the shape of a long narrow slot and including an improved arrangement of deckle means associated with the slot for effectively regulating the width and the thickness of a plastic film or sheet extruded from the die.

It is important and desirable from the viewpoint of economics that extruded plastic film or sheet material be uniform in width and thickness at the time of formation. So far as we have been able to ascertain, presently known plastic extruders are not capable of extruding films or sheets that are uniform both in width and in thickness.

Satisfactory regulation and control of the width of extruded plastic films is attained by employment of an external deckle of the type disclosed in United States Pat. No. 3,293,689 to Chiselko et al. However, the problem of non-uniform film thickness is not solved by the use of the Chiselko et al or similar types of external deckles. In other words, known external deckles are capable of effectively regulating only the width of extruded plastic films but are incapable of also regulating the thickness of such films.

Non-uniform or uneven film thickness is characterized by regions of greatly increased thickness along the edges of the film, known as "edge beads." These beads are caused by contraction in width of the film along its edges after the film leaves the die. Such contraction is commonly referred to as "neck in." The amount of neck in and the resulting edge beads varies with the characteristics of particular plastic materials including viscosity, surface tension, etc. In the manufacture of useful and commercially acceptable products utilizing plastic films, the edge beads must be severed from the film or from a combined film and substrate. This is uneconomical as it results in substantial increases in labor and equipment costs and considerable losses in materials.

Over the years, there have been a number of developments directed to the elimination or minimization of formation of edge beads in plastic films by the use of internal deckles. Such developments are exemplified by the constructions disclosed in corresponding United States Pats. including No. 2,712,155 to Nelson, No. 2,982,995 to Groleau, No. 3,018,515 to Sneddon and No. 3,107,191 to Brownold. Each of these developments, while helpful in reducing the creation of edge beads on extruded film, has operating disadvantages which have mitigated against general acceptance and use in the plastics extrusion coating and casting industry. For example, the deckle rod of patent No. 2,982,995 must be located very close to the discharge end of the die orifice in order to reduce travel of the plastic material toward the ends of the die after it passes the deckle rod. Such travel cannot be adequately controlled, thereby resulting in objectionable instability in the width of the extruded film. Moreover, shortening the distance from the deckle rod to the discharge end of the die orifice, which distance is known as the "land length," results in poor quality extruded film in the case of many of the commonly used plastic materials.

We have discovered that both the width and the edge thickness of a plastic film extruded from a slot type orifice die can be effectively regulated and controlled by the use of external and internal deckle means in combination with a slot type orifice die in accordance with this invention. As will be explained further along herein and shown in the drawings, the external deckle means is preferably of the type disclosed in said Chiselko patent and the internal deckle means is preferably one of the forms described herein.

SUMMARY OF THE INVENTION

The present invention is comprised of the combination of a die for extruding films or sheets of flowable plastic material, external deckle means and internal deckle means. The die has a discharge orifice in the form of a relatively long narrow slot. One extremity of the orifice constitutes an inlet which communicates with a manifold for containing a supply of the plastic material in molten state. The other extremity of the orifice constitutes an outlet which communicates with the atmosphere. The inlet and the outlet are coextensive with the length of the slot. The external deckle means is carried by the die and seals and end portion of the orifice outlet. The internal deckle means extends into the die and seals and end portion of the orifice inlet. The external and internal deckle means are independently adjustable whereby to vary the width and the edge thickness of the extruded film or sheet, as desired.

The external deckle means may be of known construction. The internal deckle means is in the form of a rod having a free end portion which projects into the die and bears against portions of the die which define the orifice inlet. This free and portion, preferably and for best results, has a configuration corresponding to one of those which is herein described and illustrated.

The primary object of this invention is to provide an improved arrangement of deckle means for effectively regulating and controlling both the width and thickness at the edges of a plastic film or sheet extruded from a die having an orifice in the shape of a relatively long narrow slot.

Another object of the invention is to provide a die of the stated type which eliminates or minimizes formation of edge beads in the film whereby to produce a film of substantially uniform thickness throughout its length.

Another object of the invention is to provide extrusion die apparatus of the stated type having its parts so constructed and arranged as to permit ready adjustment whereby the width and edge thickness of the film may be readily varied, as desired, while the apparatus is in active service.

A further object of the invention is the provision of an extrusion die of the stated type that is capable of being advantageously employed to perform its intended functions with plastic materials of widely different characteristics. The objects and advantages of this invention will be apparent and manifest to persons trained in the art from the ensuing detailed description and the accompanying drawings which describe and illustrate a preferred embodiment of the invention and several modifications thereof.

BRIEF DESCRIPTION OF THE DRAWINGS

In the drawings, wherein like reference numerals denote corresponding parts in the several views:

FIG. 1 is a central vertical cross-sectional view of a portion of a plastic extrusion die constructed in accordance with this invention;

FIG. 2 is a view taken along line 2—2 of FIG. 1;

FIG. 3 is a fragmentary view showing the portion of FIG. 2 within the broken line circle in enlargement;

FIG. 4 is a side elevation view of one form of internal deckle means according to this invention;

FIG. 5 is a top plan view of an end portion of FIG. 4;

FIG. 6 is an elevation view as seen from the right end of FIG. 4;

FIGS. 7, 8 and 9 correspond to FIGS. 4, 5 and 6, respectively, and illustrate a second form of internal deckle means of this invention;

FIGS. 10, 11 and 12 also correspond to FIGS. 4, 5 and 6, respectively, and illustrate a third form of internal deckle means of this invention;

FIG. 13 is a view taken along line 13—13 of FIG. 10; and

DESCRIPTION OF THE PREFERRED EMBODIMENT

Figure 14:
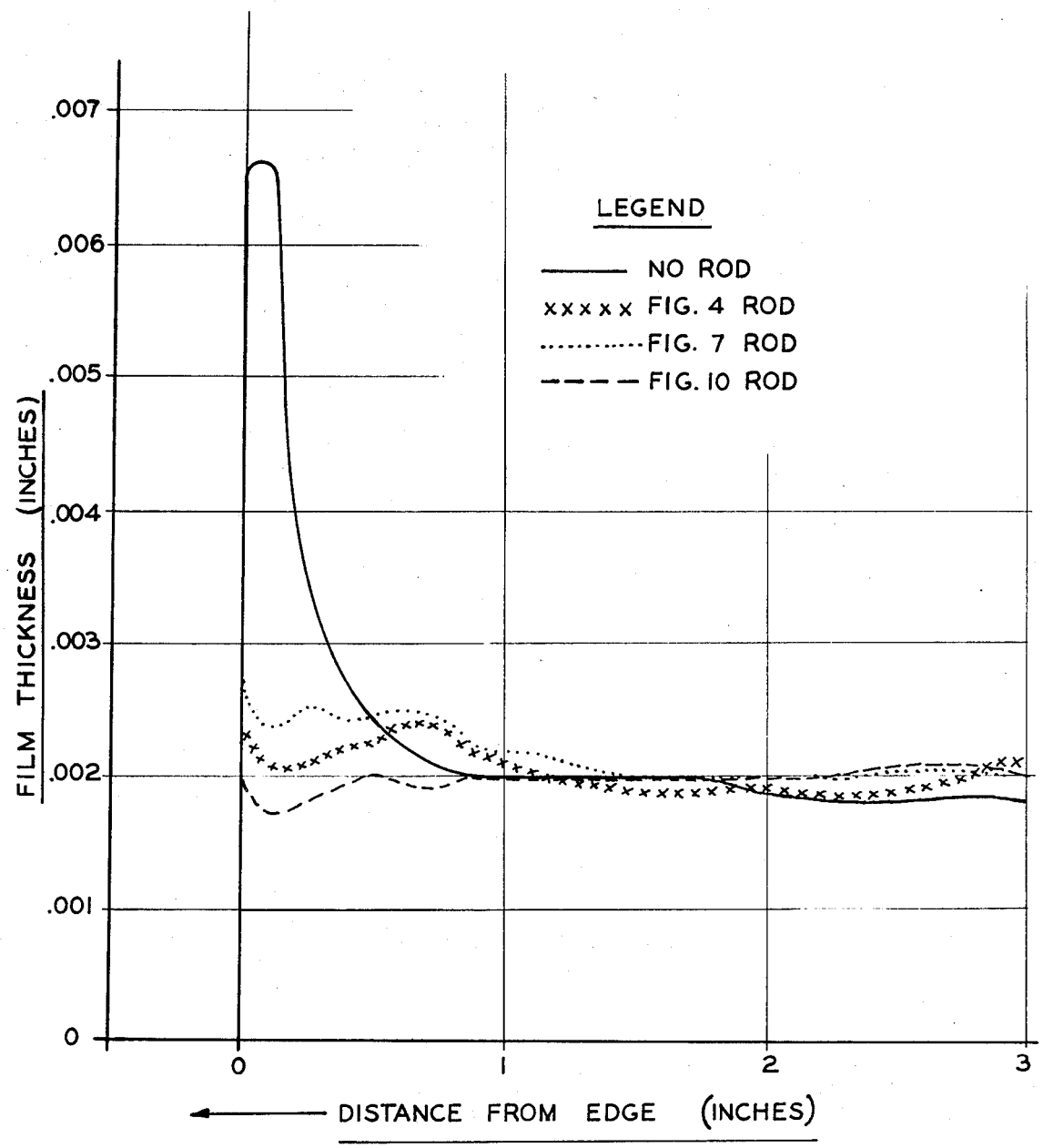
FIG. 14 is a graph depicting the thicknesses of plastic film produced by a die of the stated type when used without and with internal deckle means according to this invention.

Referring initially to FIGS. 1 and 2 of the drawings, we have illustrated therein a portion of a typical die 15 for use in extruding a plastic film or sheet. This die is substantially the same as the one disclosed in said patent No. 3,293,689 to which reference may be had for details in addition to those set forth herein. Die 15 includes a body 16 and a pair of complementary jaws 17 and 18. The lower ends of jaws 17 and 18 are provided with respective, integral, lateral track extensions 17a and 18a. The die body is provided with a manifold hole 20 for receiving molten plastic material from a conventional extruder or other known means (not shown). The die body is also provided with a passage 21 which communicates with the manifold hole. The manifold hole and the passage extend the full length of body 16. Jaw 17 is stationary and is affixed to body 16 by screws 22. Jaw 18 is adjustable, i.e., movable toward or away from jaw 17, and is secured to the body by screws 23. Both jaws extend the full length of the body and the illustrated assembly of die body 16 and jaws 17 and 18 is closed off at each end by a corresponding die end cap 24 which is secured to the ends of the jaws and the body by bolts (not shown). Each end cap carries a die end block 25 which is secured thereto by screws 26. The die jaws may be heated, as required, by means of suitable electric heaters 27 which are attached to the jaws by clamps 28 and screws 29.

Opposing faces of jaws 17 and 18 are machined their full lengths to define a passage 30 and a discharge orifice 31 having the shape or form of a relatively long narrow slot which is narrower than passage 30. The upper extremity 32 of orifice 31 constitutes its inlet and the lower extremity 33 constitutes its outlet (FIG. 3). Passages 21 and 30 and orifice 31 are in a common vertical plane and are aligned for communication with manifold hole 20 whereby molten plastic admitted into the manifold hole is transmitted to and through the discharge orifice. The respective surface portions 34 and 35 of jaws 17 and 18 which define the lower end of passage 30 are convergent and at corresponding angles of about 45° to the horizontal (FIG. 3).

The earlier referred-to external deckle means is preferably the same as that disclosed in said patent No. 3,293,689 and comprises a generally U-shaped body 36 slidable along the die jaws and including a pair of inwardly projecting rail extensions 37 which ride on and along jaw track extensions 17a and 18a. The external deckle means also includes a deckle bar 38, a backing piece 39 and a plurality of set screws 40. As shown, deckle bar 38 bridges and seals a portion of orifice outlet 33. The die is equipped at its other end with a like external deckle means. Reference is had to said patent No. 3,293,689 for further details of the construction and operation of the external deckle means.

Reference is next had to FIGS. 1 and 3 to 6 for an understanding of a first recommended internal deckle means 41 according to the invention. This deckle means, as well as the deckle means of FIGS. 7 through 13, is made from a right circular cylindrical metal rod and consists of an elongated, rectilinear body part 42, an inner end part 43 and an outer end part 44 which is bent and at a right angle to the body part. Deckle means 41 projects into the die by way of an opening 45 which extends through end block 25 and cap plate 24 and is aligned with the lower portion of passage 30 (FIGS. 1 and 3). Opening 45 is provided with a suitable sealing ring 46 to prevent leakage of plastic material. Inner end part 43 is in the form of a wedge having convergent upper and lower surfaces 47 and 48, respectively, which intersect along a line 49 that is normal to the axes of body part 42 and outer end part 44. As shown, rod 41 is slidable in passages 30 and 45 and is so arranged relative to the die that its body part 42 is tangential to and in contact with surfaces 34 and 35 of die jaws 17 and 18 (FIG. 3).

As is indicated in FIGS. 1 and 2, external deckle bar 38 and internal deckle rod 41 are adjustably positioned relative to the die jaws 17 and 18 and to each other along corresponding parallel paths. We have found that the free end of rod end part 43 should be located an offset distance X from the inner end, i.e., left end, of deckle bar 38, as viewed in FIG. 1.

The internal deckle rod of FIGS. 7, 8 and 9 is the same as that of FIGS. 4, 5 and 6 with the exception of the configuration of its inner end part 51. This inner end part is formed with a V-shaped groove 52 extending inwardly from its free extremity. This groove is defined by converging surfaces 53 and 54 which intersect along a line 55 that is normal to the axes of the other parts of the deckle rod.

The internal deckle rod of FIGS. 10 to 13 is also the same as that of FIGS. 4, 5 and 6 except for its inner end part 57 which has converging sides 58 and 59 and which is formed with a pair of oppositely disposed, rearwardly convergent, V-shaped grooves 60. Grooves 60 meet at point 61 (FIG. 12) which is coincident with the axis of rod part 57.

For the purpose of describing the operation of our present invention, it is assumed that the parts are in the relative position shown in FIGS. 1, 2 and 3. It is also assumed that molten plastic material is fed to die manifold hole 20 by a suitable known type of extruder. The molten plastic passes successively through passages 21 and 30 and then through orifice 31 from whence it is discharged as a film. The width of the film is determined by the position of the external deckle means, particularly dekcle bars 38, and the thickness of the film by various factors including the width of orifice 31. The internal deckle rod 41, for which either of deckle rods 50 or 56 may be substituted, serves as a means for reducing the flow of plastic material at the edges of the film and thereby results in uniform film thickness with controlled width.

It will be observed that the pressure of the plastic material in passage 30 exerts a force on internal deckle rod 41. This presses the deckle rod against the inclined surfaces 34 and 35 and provides an effective seal so that little, if any, of the plastic material leaks past the deckle rod. The diameter of each of the above described deckle rods is slightly less than the minimum width of passage 30. It will be appreciated that minor adjustments of die jaw 18 toward or away from fixed die jaw 17, for the purpose of adjusting the width of orifice 31, can be made without adversely affecting the sealing of the internal deckle rod.

It has been found that the configuration of the inner end parts 43, 51 and 57 of the respective internal deckle rods, the deckle rod's rotational position, and the distance X from the inner end of the internal deckle rod to the end of corresponding deckle bar 38, are of major importance in obtaining uniform film thickness. The above indicated parameters are markedly affected by the characteristics of the specific plastic material being run, especially by its viscosity which, in the case of most plastic materials, is denominated by the terms "melt index" or "melt flow."

The present invention was successfully tested with various plastic compositions and produced satisfactory films and sheets of such compositions of controlled width and thickness and fulfilling the objectives appearing earlier herein. In one series of tests, the plastic employed was Type 4140 polyethylene resin produced by Union Carbide Crop., New York, New York. This plastic was run through a 3-½ inches extruder and an extrusion die having its discharge orifice set at 0.020 inch. The extrusion die was an Egan Series 32 die, manufactured by Egan Machinery Company, Somerville, New Jersey. The films produced in these tests were extrusion coated onto a release type paper web at the rate of 80 feet per minute. The films were subsequently stripped off the web and their thicknesses were measured along one edge and various distances inwardly from that edge.

One sub-series of these tests utilized the disclosed external deckle means but did not employ any internal deckle means. Other sub-series of the tests utilized the disclosed external deckle means and each of the disclosed internal deckle means. The results of the various tests are plotted on the graph of FIG. 14. Referring further to FIG. 14, the full-line curve represents the film edge thicknesses in tests employing only the external deckle means; the broken x-line curve represents film edge thicknesses employing both the external deckle means and the internal deckle rod of FIG. 4; the dotted-line curve represents film edge thicknesses employing the deckle rod means of FIG. 7; and the broken-line curve represents the film edge thicknesses employing the internal deckle rod means of FIG. 10. In all of the last referred to sub-series of tests, the offset distance X was 1¼ inches. Lesser distances than this generally resulted in an increase in the thickness of the film edge bead while greater distances resulted in undesirable thinning out and instability of the film edge. However, in tests using plastic materials of different melt index or melt flow, optimum results were obtained with an offset distance X within range of from about 0.25 to 2 inches, depending on the particular plastic material. Also, the offset distance X for optimum operation varies to some extent with the type of internal deckle means employed.

All of the curves of FIG. 14, in which internal deckle means were employed, represent the optimum results in one of various rotational positions of the internal deckle rod. It has been determined that best results, for any one set of plastics and operating conditions, including type of plastic, plastic temperature, rate of discharge and type of die construction, were obtained by various arrangements of the selected internal deckle rod, the rotational position of the deckle rod, and the particular offset distance X. However, in most cases, only minor changes in these parameters from those disclosed herein will be required. Such changes may be accomplished while the equipment is in active service.

As is evident from FIG. 14, this invention provides suitable means for eliminating or minimizing film edge bead and thus obviates the need for trimming the edges of extruded film or the edges of combinations of film and substrate.

Based on the foregoing, it is believed that the construction, operation, objects and advantages of our present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawing shall be interpreted as illustrative only and not in a limiting sense.

We claim:

1. In combination with a die for extruding a film or sheet of flowable plastic material and having a discharge orifice in the form of a relatively long narrow slot, said orifice having an inlet coextensive with the length of the slot and communicating with a manifold for containing a supply of the plastic material in a molten state and having an outlet coextensive with the length of the slot and communicating with the atmosphere,
   a. external deckle means carried by the die and sealing an end portion of the orifice outlet, and
   b. internal deckle means extending into the die and sealing an end portion of the orifice inlet corresponding to said end portion of the orifice outlet.

2. The combination according to claim 1 wherein
   a. the external deckle means comprises
      1. a deckle bar which bears against the die and bridges said portion of the orifice outlet and which terminates in an inner end, and
   b. the internal deckle means comprises 1. a deckle rod having an end part within the die, said end part terminating in an inner end which is located in the die at a point beyond the inner end of the deckle bar and which is offset therefrom a distance within the range of from about 0.25 inch to about 2.0 inches as measured along the rod.

3. The combination according to claim 2 wherein the portion of the rod within the die is rectilinear and, except for said end part, right circular cylindrical in transverse cross section.

4. The combination according to claim 2 wherein the die is provided with a passage which is coextensive with the length of the slot, which is wider than the slot and which establishes communication between the manifold and the orifice inlet, the portion of the passage immediately adjacent the orifice inlet being defined by a pair of converging surfaces, each of which is at an angle of about 45° to the plane of the discharge orifice.

5. The combination according to claim 4 wherein a portion of the rod within the die is rectilinear and right circular cylindrical in transverse cross section and bears against the converging surfaces.

6. The combination according to claim 2 wherein the portion of the deckle rod within the die is rectilinear and, except for said end part, right circular cylindrical in transverse cross section and wherein said end part is in the form of a wedge.

7. The combination according to claim 6 wherein said end part of the rod has a pair of substantially planar converging surfaces which intersect along a line that is substantially normal to the longitudinal axis of said portion of the rod.

8. The combination according to claim 2 wherein the portion of the deckle rod within the die is rectilinear and, except for said end part, right circular cylindrical in transverse cross section and wherein said end part is provided with a V-shaped groove extending inwardly from its free end.

9. The combination according to claim 8 wherein said groove is defined by a pair of substantially planar converging surfaces which intersect along a line that is substantially normal to the longitudinal axis of said portion of the rod.

10. The combination according to claim 2 wherein the portion of the deckle rod within the die is rectilinear and, except for said end part, right circular cylindrical in transverse cross section and wherein said end part is provided with a pair of diametrically opposed V-shaped grooves.

11. The combination according to claim 10 wherein each of said grooves is defined by a pair of substantially planar converging and intersecting surfaces that are triangular in configuration.

12. The combination according to claim 11 wherein the line of intersection of said surfaces of one of said grooves intersects the line of intersection of said surfaces of the other of said grooves at a point which is substantially coincident with the longitudinal axis of said portion of the rod.

* * * * *

UNITED STATES PATENT OFFICE
CERTIFICATE OF CORRECTION

Patent No. 3,694,132　　　　　　　　Dated September 26, 1972

Inventor(s) William S. Bunte and Lino E. DeGasperis

It is certified that error appears in the above-identified patent and that said Letters Patent are hereby corrected as shown below:

Column 2, line 26, cancel "and", second occurance, and substitute --- "an"---;

line 28, cancel "and", second occurance, and substitute --- "an"---;

line 37, cancel "and", first occurance, and substitute ---"end".

Column 5, line 7, cancel "dekcle" and substitute ---deckle---.

Column 6, line 45, cancel "drawing" and substitute ---drawings---.

Signed and sealed this 15th day of May 1973.

(SEAL)
Attest:

EDWARD M. FLETCHER, JR.　　　　　　　　ROBERT GOTTSCHALK
Attesting Officer　　　　　　　　　　　Commissioner of Patents